(12) United States Patent
Clark et al.

(10) Patent No.: US 11,126,460 B2
(45) Date of Patent: Sep. 21, 2021

(54) LIMITING FOLDER AND LINK SHARING

(71) Applicant: Hitachi Vantara LLC, Santa Clara, CA (US)

(72) Inventors: Ngale Clark, Santa Clara, CA (US); Sarah Fahey, Santa Clara, CA (US); Walter Wohler, Santa Clara, CA (US); Alexander Leich, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 210 days.

(21) Appl. No.: 16/347,895

(22) PCT Filed: Feb. 3, 2017

(86) PCT No.: PCT/US2017/016328
§ 371 (c)(1),
(2) Date: May 7, 2019

(87) PCT Pub. No.: WO2018/143996
PCT Pub. Date: Aug. 9, 2018

(65) Prior Publication Data
US 2019/0354395 A1 Nov. 21, 2019

(51) Int. Cl.
*G06F 7/04* (2006.01)
*G06F 9/46* (2006.01)
(Continued)

(52) U.S. Cl.
CPC ............ *G06F 9/468* (2013.01); *G06F 9/5016* (2013.01); *G06F 15/16* (2013.01); *G06F 16/116* (2019.01);
(Continued)

(58) Field of Classification Search
CPC ........ G06F 15/16; G06F 16/00; G06F 16/116; G06F 16/162; G06F 16/178; G06F 16/958; G06F 7/00; G06F 9/468; G06F 9/5016
See application file for complete search history.

(56) References Cited

U.S. PATENT DOCUMENTS 8,490,156 B2   7/2013   Huber et al.
9,087,208 B2   7/2015   Ibel et al.
(Continued)

OTHER PUBLICATIONS

International Search Report of PCT/US2017/016328 dated Apr. 20, 2017.

*Primary Examiner* — Gary S Gracia
(74) *Attorney, Agent, or Firm* — Mattingly & Malur, PC

(57) ABSTRACT

In some examples, a computer system may receiving a request to allow a second user associated with a second user account to access at least one of a folder or a link associated with a first user account of a first user. The computer system may determine a first profile associated with the first user account, and may further determine whether sharing whitelisting is enabled for the first profile. Additionally, the computer system may determine a second profile associated with the second user account, and may determine whether the second profile is included in a sharing whitelist of the first profile. When sharing whitelisting is enabled for the first profile, the computer system may allow a client device associated with the second user account to access the folder and/or the link when the second profile is included in the sharing whitelist of the first profile.

20 Claims, 11 Drawing Sheets

(51) Int. Cl.
*G06F 16/16* (2019.01)
*G06F 16/958* (2019.01)
*G06F 16/178* (2019.01)
*G06F 16/11* (2019.01)
*G06F 9/50* (2006.01)
*G06F 15/16* (2006.01)
*H04N 7/16* (2011.01)

(52) U.S. Cl.
CPC .......... *G06F 16/162* (2019.01); *G06F 16/178* (2019.01); *G06F 16/958* (2019.01)

(56) References Cited

U.S. PATENT DOCUMENTS

| | | | |
|---|---|---|---|
| 9,165,160 B1 | 10/2015 | Tidd | |
| 9,264,480 B1 | 2/2016 | Saylor et al. | |
| 9,384,337 B1* | 7/2016 | Sirbu | G06F 12/1483 |
| 9,426,216 B2* | 8/2016 | Subramani | H04L 67/1095 |
| 10,956,371 B2* | 3/2021 | Todd | G06F 9/5016 |
| 2009/0327244 A1* | 12/2009 | Rizal | G06F 16/40 |
| 2014/0067865 A1* | 3/2014 | Kirigin | H04L 63/168 |
| | | | 707/783 |
| 2014/0122345 A1* | 5/2014 | Argue | G06Q 30/04 |
| | | | 705/304 |
| 2014/0230009 A1* | 8/2014 | Subramani | H04L 67/10 |
| | | | 726/1 |
| 2014/0258418 A1* | 9/2014 | Subramani | H04L 67/1095 |
| | | | 709/205 |
| 2014/0259190 A1* | 9/2014 | Kiang | G06F 21/6218 |
| | | | 726/30 |
| 2015/0033224 A1* | 1/2015 | Maheshwari | G06F 9/45533 |
| | | | 718/1 |
| 2015/0156274 A1* | 6/2015 | Alten | G06F 16/245 |
| | | | 709/204 |
| 2015/0220686 A1* | 8/2015 | Rodriguez | H04L 63/08 |
| | | | 726/4 |
| 2016/0140139 A1* | 5/2016 | Torres | G06Q 10/10 |
| | | | 707/610 |
| 2016/0378782 A1* | 12/2016 | Jiang | G06F 21/6209 |
| | | | 726/7 |
| 2017/0193447 A1* | 7/2017 | Piyush | G06Q 10/103 |
| 2017/0193448 A1* | 7/2017 | Piyush | H04L 67/12 |

\* cited by examiner

LIMITING FOLDER AND LINK SHARING

TECHNICAL FIELD

This disclosure relates to the technical field of managing the sharing of data.

BACKGROUND

File synchronization and sharing solutions may create the ability for collaboration within an enterprise or other organization. Users may be able to share files and folders with other users and may automatically receive updates made by other users to a shared file or folder. Such an arrangement may increase productivity on projects and may provide improved dissemination of information. However, an administrator of such a system may encounter difficulties when implementing controls on sharing, such as for enforcing security policies in an efficient manner while still enabling users to share files and folders with other appropriate users. For example, implementing sharing controls at the file and folder level may be too granular for easy administration, while implementing sharing controls at the domain level may provide a result that is overly coarse.

SUMMARY

Some implementations include a computer system that may receive a request to allow a second user associated with a second user account to access at least one of a folder or a link associated with a first user account associated with a first user. The computer system may determine a first profile associated with the first user account, and may further determine whether sharing whitelisting is enabled for the first profile. In addition, the computer system may determine a second profile associated with the second user account, and may determine whether the second profile is included in a sharing whitelist of the first profile. When sharing whitelisting is enabled for the first profile, the computer system may allow a client device associated with the second user account to access at least one of the folder or the link when the second profile is included in the sharing whitelist of the first profile.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
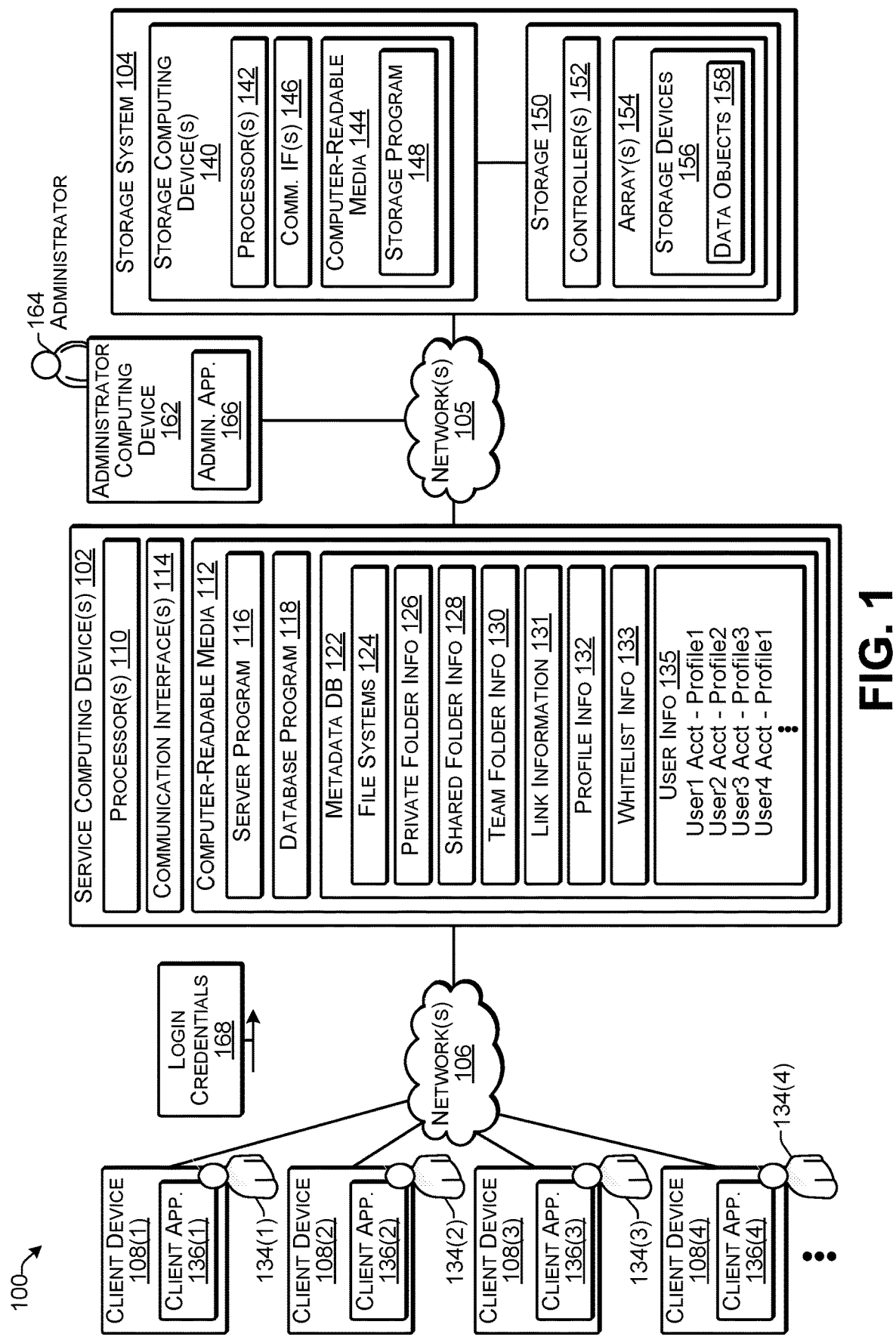
FIG. 1 illustrates an example architecture of a system for managing sharing of information according to some implementations.

Some implementations herein are directed to techniques and arrangements for profile-based whitelisting for managing the sharing of files, folders, links, and/or other information. The management of the sharing may be based at least partially on associating users with profiles. For instance, a profile may include a mapping of users to functionality granted in a computer system for an organization or other entity. The profiles herein may further be related to a collection of users to which a common level of functionality has been granted.

Administrators may at least partially control sharing by enabling sharing whitelists based on profiles when creating or modifying a profile.

As one example, suppose that a first profile is being created as "profile1". An administrator may enable and specify a sharing whitelist for profile1. The sharing whitelist may be a collection of zero or more profiles. The users that are members of profile1 may only share files and folders with users that are members of the profiles that are included in the sharing whitelist of profile1. This enables the administrator to specify an entire range of sharing options, e.g., allowing no sharing by members of a profile (share whitelist enabled and empty); allowing sharing by members of a profile only with members of specific other profiles (share whitelist enabled and specific profiles listed in the sharing whitelist); or allowing unencumbered sharing by members of a profile (share whitelist disabled for the profile).

The sharing whitelist may be added as a configuration setting for a profile. For instance, the sharing whitelist may be represented by two settings: a first setting that enables or disables the sharing whitelist, and a second setting to specify the list of profiles in the whitelist, if any. In some examples, a graphic user interface (UI) may be provided as a mechanism for enabling an administrator to enable or disable the sharing whitelisting feature, and add profiles to the sharing whitelist or remove profiles from the sharing whitelist. For instance, the administrator may be able to access a list of all available profiles that have been created for the system. In the case of a large number of profiles, the administrator may be able to enter text in a search bar, or the like, to filter a list of displayed available profiles. After changes to a profile are saved, the system may automatically update the sharing whitelist of all users associated with that profile based on the changes.

The manner in which a sharing whitelist is evaluated and enforced may differ depending on what is being shared, such as shared folders, team folders, and shared private links in the examples herein, although other types of information sharing may also be controlled using the techniques herein. As one example, a shared folder may be a folder that is owned by a first user and that may be accessed by one or more other users. The storage consumed by the files in the shared folder may count toward the first user's (i.e., the owner's) storage quota. On the other hand, a team folder may be a folder that is not owned by any user and that may be accessed and/or managed by one or more users. The storage consumed by the files in the team folder may count toward a storage quota defined for the team folder from a storage pool, and therefore may not count against the storage quota allotted to any particular user. Furthermore, users herein may also have private folders that are owned by and that are able to be accessed by only one user/owner. The storage consumed by all files in a private folder may count toward the user/owner's storage quota, but as these folders are not shared, the whitelist techniques herein are generally not applied to private folders.

According to implementations herein, access to a shared folder may be determined by a service computing device when a first user sends a request to invite a second user to access the shared folder. For example, the first user may be the owner of a shared folder, and may select the second user to be invited to have access to the shared folder. In response, before allowing the second user to access the shared folder, the service computing device may determine if the profile of first user/owner has sharing whitelisting enabled. If the profile of the first user/owner does have a sharing whitelisting enabled, then the service computing device may determine of which profiles the invited user is a member. The service computing device may then compare the list of profiles of which the invited user is a member with the list of profiles in the sharing whitelist of the first user's profile. If there are any matches between the two lists then the second user is sent an invitation to access the shared folder. Otherwise, the service computing device may send, to first user, a notification that the first user is not allowed to share the shared folder with the specified second user.

Similarly, in the case of a team folder, suppose that only a manager of a team folder may send an invitation for another user to access the team folder. For example, suppose that a first user and a second user are both managers of a team folder. If sharing whitelisting is disabled for the profile of either of the managers of the team folder, then that means there is no sharing restrictions on the team folder and a third user that is invited to access the team folder may be granted access by the service computing device. On the other hand, if sharing whitelisting is enabled for profiles associated with both managers, then the sharing whitelist to check is the combined whitelists of the first user/manager and the second user/manager. Accordingly, if the third user is a member of a profile that is listed in either of the whitelists of the first manager's profile(s) or the second manager's profile(s), then the service computing device sends the invitation to the third user and permits the third user to access the team folder.

In addition, the sharing whitelisting techniques herein may also be applied to shared private links. For example, the links herein may be uniform resource locators (URLs) or other network addresses, which, when selected by a user, direct a browser or other application on the user's computing device to a network location (e.g., at the service computing device) at which the user is able to access the data being shared. Examples of links may include HTML (HyperText Markup Language) links, other types of hyperlinks, or any other network address that may be used by an application on a client device to access information on a server or other service computing device. For example, the links herein may point to a folder, a file or other data object within a folder, and/or a particular part of a file or other data object managed by the service computing device(s) herein. Thus, a link may be a way for a first user to provide a second user with access to data associated with the first user and linked to a specific network address or other network-accessible location corresponding to information included in the link. For instance, the link may include a string of characters that provide information to the application on the client device regarding the network location of the linked information. A private link may include a link that can only be accessed by authorized users, such as users (e.g., internal users) who are logged in with the service computing device or otherwise authorized by the service computing device to access the private link.

The sharing of private links may be controlled by the service computing device whenever a user tries to access the private link. For example, suppose that a first user creates a private link and a second user clicks on or otherwise attempts to access the private link. The second user may be directed to a URL or other network location managed by the service computing device at which the second user may be required to log in with user credentials (if not already provided) before being permitted to access the file, folder, or other data at the network location. In addition, before being granted access to the link data, the service computing device may determine if sharing whitelisting is enabled for a profile of the first user. If so, the service computing device may determine a list of profiles to which the second user belongs and compare these profiles with a list of whitelisted profiles for the profile(s) to which the first user belongs. If there are any matches between the two lists of profiles, then the service computing device allows the second user to access to the content corresponding to the link. Otherwise, the service computing device may send a notification to the second user's computing device indicating that the second user does not have permission to access the link.

On the other hand, a public link may be accessible by anyone whether an authorized user or not. Thus, the service computing device does not require a recipient attempting to access a public link to provide credentials to access the file, folder, or other data stored in association with the public link. Accordingly, the whitelisting techniques herein may generally not be applied to public links.

For discussion purposes, some example implementations are described in the environment of one or more service computing devices in communication with one or more network storage locations and a plurality of client devices for managing sharing of files, folders, links, and/or other data. However, implementations herein are not limited to the particular examples provided, and may be extended to other types of computing system architectures, other types of storage environments, other types of client configurations, other types of shared data, and so forth, as will be apparent to those of skill in the art in light of the disclosure herein.

FIG. 1 illustrates an example architecture of a system 100 configured for managing the sharing of information according to some implementations. The system 100 includes a least one service computing device 102, also referred to herein as a node, that is able to communicate with, or is otherwise coupled to, a storage system 104, such as through one or more networks 105. Further, the service computing device 102 may be able to communicate over one or more networks 106 with one or more client computing devices 108, such as client devices 108(1), 108(2), 108(3), 108(4), . . . , which may be any of various types of computing devices, as discussed additionally below.

In some examples, the at least one service computing device 102 may include one or more servers or other types of computing devices that may be embodied in any number of ways. For instance, in the case of a server, the programs, other functional components, and at least a portion of data storage may be implemented on at least one server, such as in a cluster of servers, a server farm, a data center, a cloud-hosted computing service, and so forth, although other computer architectures may additionally or alternatively be used. In the illustrated example, the service computing device 102 includes, or may have associated therewith, one or more processors 110, one or more computer-readable media 112, and one or more communication interfaces 114.

Each processor 110 may be a single processing unit or a number of processing units, and may include single or multiple computing units, or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. As one example, the processor(s) 110 may include one or more hardware processors and/or logic circuits of any suitable type specifically programmed or configured to execute the algorithms and processes described herein. The processor(s) 110 may be configured to fetch and execute computer-readable instructions stored in the computer-readable media 112, which may program the processor(s) 110 to perform the functions described herein.

The computer-readable media 112 may include volatile and nonvolatile memory and/or removable and non-removable media implemented in any type of technology for storage of information, such as computer-readable instructions, data structures, program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the service computing device 102, while in other examples, the computer-readable media 112 may be partially remote from the service computing device 102. For instance, in some cases, the computer-readable media 112 may include a portion of storage in the storage system 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the service computing device 102. Functional components stored in the computer-readable media 112 may include a server program 116 and a database program 118, each of which may include one or more computer programs, applications, executable code, or portions thereof. For example, the server program 116 may provide communication functionality with the client devices 108 and the storage system 104. The database program 118 may include a database management function for creating and managing a metadata database 122 containing metadata, such as one or more file systems 124 or the like, corresponding to data stored at the storage system 104. The database program 118 may further perform a folder management function for creating and managing private folder information 126, shared folder information 128, and team folder information 130. The database program 118 may further perform a management function for managing of other types of information included in the metadata database 122, such as link information 131, profile information 132, whitelist information 133, and user information 135. For example, the database program 118 may include executable instructions configured to cause the database program 118 to maintain the folder information as part of the metadata database 122 as well as perform the other functions described herein attributed to the service computing device 102 for creation and management of folders and associated file systems, as well as links, profiles, and whitelists, according to the algorithms and techniques described herein. Additional functional components stored in the computer-readable media 112 may include an operating system (not shown in FIG. 1) for controlling and managing various functions of the service computing device 102. In some cases, the functional components may be stored in a storage portion of the computer-readable media 112, loaded into a local memory portion of the computer-readable media 112, and executed by the one or more processors 110.

In addition, the computer-readable media 112 may store data and data structures used for performing the functions and services described herein. For example, the computer-readable media 112 may store the metadata database 122. In the illustrated example, the metadata database 122 includes a plurality of file systems 124. In some cases, individual file systems 124 may each correspond to one or more folders. In addition, the metadata database 122 may include other information that may be included in the file systems 124, or portions of which may be stored separately from the file systems 124. Examples of the other information may include the private folder information 126, the shared folder information 128, the team folder information 130, the link information 131, the profile information 132, the whitelist information 133, and the user information 135. For example, the private folder information 126, shared folder information 128, and/or team folder information 130 may indicate storage capacity limits on the corresponding folders, which users 134 have rights to access which folders, the roles of the users 134 with respect to particular folders (e.g., owner, manager, collaborator, viewer), or the like. The link information 131 may indicate storage locations associated with respective links and other information about respective links, such as the user that created the link, data associated with the link, and so forth. Further, the profile information 132 may include information about the profiles that have been created or are otherwise in effect in the system 100, and may include a mapping of functionality granted by the system and/or system administrator(s) to individual users and groups of users. The whitelist information 133 may include listings of which profiles are associated with which other profiles. Further, the user information 135 may include information about the users 134, such as user account information, user login information and user credentials, and which users are members of which profiles. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The communication interface(s) 114 may include one or more interfaces and hardware components for enabling communication with various other devices, such as over the one or more network(s) 105 and 106. Thus, the communication interfaces 114 may include, or may couple to, one or more ports that provide connection to the network(s) 105 for communicating with the storage system 104, and one or more ports that provide connection to the network(s) 106 for communication with the client devices 108. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each client device 108 may be any suitable type of computing device such as a desktop, laptop, tablet computing device, mobile device, smart phone, wearable device, and/or any other type of computing device able to send data over a network. In some cases, the client devices 108 may include a hardware configuration and logical configuration as discussed below with respect to FIG. 11. Users 134(1), 134(2), 134(3), 134(4), . . . , may be associated with client devices 108(1), 108(2), 108(3), 108(4), . . . , respectively, such as through a respective user account, user login credentials, or the like. In some examples, the client devices 108 may access the service computing device 102 via an application server (not shown in FIG. 1), while in other examples, the client devices 108 may access the service computing device 102 directly. Furthermore, the client devices 108 may be able to communicate with the service computing device 102 through the one or more networks 106, through separate networks, or through any other suitable type of communication connection. Numerous other variations will be apparent to those of skill in the art having the benefit of the disclosure herein.

Further, each client device 108(1)-108(4) may include a respective instance of a client application 136(1)-136(4) that may execute on the respective client device 108(1)-108(4), such as for communicating with the server program 116, e.g., for sending user data for storage on the storage system 104 and/or for receiving stored data from the storage system 104. As another example, the application 136 may be used by the user 134 for generating and sending a team folder request for creation of a team folder to the service computing device 102. The team folder request 138 may include various information about the requested team folder, such as desired storage capacity, users to be invited to access the team folder, and the like. In some cases, the application 136 may include a browser or may operate through a browser, while in other cases, the application 136 may include any other type of application having communication functionality enabling communication with the server program 116 over the one or more networks 106. In some examples, individual users 134 may have multiple client devices 108, and the service computing device 102 may automatically synchronize a particular user's folders to each of the client devices 108 with which the particular user is associated.

The one or more networks 105 and 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 105 and 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102 and client devices 108 are able to communicate over the one or more networks 106 using wired or wireless connections, and combinations thereof. Further, in some cases, a load balancing computing device (not shown in FIG. 1) may be located between the service computing device 102 and the client devices 108. Additionally, in some examples, the network 105 may be a LAN and the service computing device 102 and the storage system 104 may be located locally to each other.

The storage system 104 may include one or more storage computing devices 140, which may include one or more servers or any other suitable computing device, such as any of the examples discussed above with respect to the service computing device 102. The storage computing device(s) 140 may each include one or more processors 142, one or more computer-readable media 144, and one or more communication interfaces 146. For example, the processors 142 may correspond to any of the examples discussed above with respect to the processors 110, the computer-readable media 144 may correspond to any of the examples discussed above with respect to the computer-readable media 112, and the communication interfaces 146 may correspond to any of the examples discussed above with respect to the communication interfaces 114.

In addition, the computer-readable media 144 may include a storage program 148 as a functional component executed by the one or more processors 142 for managing the storage of data on a storage 150 included in the storage system 104. The storage 150 may include one or more controllers 152 associated with the storage 150 for storing data on one or more arrays 154 of storage devices 156. For instance, the controller 152 may control the arrays 154, such as for configuring the arrays 154 in a RAID configuration, or the like, and/or for presenting logical units based on the storage devices 156 to the storage program 148, and for managing data, such as data objects 158, stored on the underlying physical storage devices 156. The storage devices 156 may be any type of storage device, such as hard disk drives, solid state drives, optical drives, magnetic tape, combinations thereof, and so forth. In some examples, the one or more arrays 154 may include a thin-provisioning array configured to provide on-demand storage capacity. Further, the storage 150 may be used to create a storage pool to be used to provide storage capacity for team folders, as well as storage capacity for individual users.

In addition, the system 100 may include, or may be able to communicate with, an administrator computing device 162 associated with an administrator 164, such as through the one or more networks 105 and/or the one or more networks 106. For example, the administrator computing device 162 may include an administrator application 166 that provides the administrator 164 with information about the service computing device(s) 102 and the storage system 104, and that provides one or more user interfaces to enable the administrator 164 to manage settings in the system, including whitelist settings, profile settings, storage quota settings, and the like.

As one example, each user 134 may be a member of or otherwise associated with at least one profile through a respective user account of the user. In this example, as indicated in the user information 135, suppose that an account user1 of the first user 134(1) is associated with profile1, an account user2 of the second user is associated with profile2, an account user3 of the third user 134(3) is associated with profile3, and an account user4 of the fourth user 134(4) is associated with profile1, i.e., the same profile as the first user 134(1). Each user 134 may provide login credentials 168 (e.g., username and password and/or other secure credentials) to the service computing device 102. Following successful login by the user, the service computing device 102 may thereafter associate the corresponding client device 108 with the logged in user 134 and user account until such time as the respective user 134 is logged out. Further, while each user in this example is assigned to a single profile, in other examples, users may be assigned to or otherwise associated with multiple profiles. For example, the fourth user 134(4) might be associated with profile1 and another profile, such as profile2, profile3, or other profile (not shown in FIG. 1).

In some cases, users may be assigned or otherwise associated with a specific profile when the user logs in or otherwise registers into a domain. As an example, in the case of a WINDOWS® environment, the users may be associated with a particular profile based at least partially on a respective ACTIVE DIRECTORY® group to which the individual users belong. ACTIVE DIRECTORY® is a directory service developed by MICROSOFT® for WINDOWS® domain networks. ACTIVE DIRECTORY® groups may be used to collect user accounts, computer accounts, and other groups into manageable units. Working with groups instead of with individual users in this manner may help simplify network maintenance and administration for the administrator(s) 164.

Figure 2:
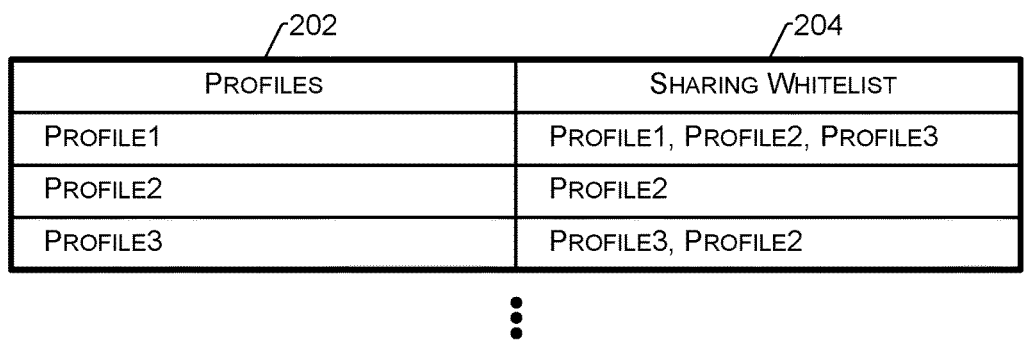
FIG. 2 illustrates an example whitelist information data structure according to some implementations.

FIG. 2 illustrates an example of a whitelist information data structure 200 according to some implementations. The whitelist data structure 200 may correspond at least in part to the whitelist information 131 discussed above in FIG. 1, and may be used to determine information sharing permissions based at least partially on the profile associations for individual users and user accounts, as indicated at user information 135 above. In this example, the whitelist data structure 200 includes whitelist profiles 202 and corresponding sharing whitelists 204 for each profile 202. Further, while three profiles 202 are shown in this example, in other examples, there may be more or fewer profiles. For example, an administrator may set up as many profiles as are useful to meet the size and diversity of the corresponding enterprise, organization, business, or other entity.

As mentioned about, a profile may enable a mapping of users to functionality granted in the system, and may include a particular configuration of settings. The settings may be for features, such as file synchronization and sharing, administrative privileges, etc. In addition to the feature settings, in some examples, a profile may contain a list of ACTIVE DIRECTORY® groups and/or Security Assertion Markup Language (SAML) identity providers. The profile settings apply to the users that are part of these specified ACTIVE DIRECTORY® groups and/or SAML identity providers. For example, a profile may have a file synchronization and sharing feature, e.g., with a 90 GB storage quota and with public and private link sharing enabled. Profiles may also specify what a collection of users is able to do, such as file synchronizing, file sharing, link sharing, backing up data, and so forth. For instance, profiles may enable sharing of links for uploading data, sharing links for reading data, whether links can be shared with only internal users (who have to authenticate access), or with external users as well, e.g., a public link that can be accessed by anybody.

Furthermore, profiles may be set up based on the business structure of the company, organization, or other entity. For example employees in an accounting department may be members of a first profile, employees in a sales department may be members of a second profile, employees in an engineering department may be members of a third profile, employees in a marketing department may be members of a fourth profile, and so forth. The profile whitelisting herein may employ a list of profile groupings that may be configured on the service computing device. As illustrated in the data structure 200, an administrator may decide to assign a set of profiles to a given profile 202 as the corresponding sharing whitelist 204.

In this example, the sharing whitelist 204 for profile1 includes profile1, profile2, and profile3. On the other hand, the sharing whitelist for profile2 includes only profile2, and the sharing whitelist for profile3 includes profile3 and profile2. Accordingly, a user who belongs to profile1 may share information with users who are members of profile1, profile2, and profile3, but a user who is a member of profile2 can only share information with other members of profile2, and a user who is a member of profile3 can only share information with members of profile3 and members of profile2.

As one example, suppose that in the example of FIG. 1, the first user 134(1) (associated with profile1) sends from the first client device 108(1), a request to invite users 134(2)-134(4) to access a shared folder owned by the first user. The service computing device 102 may receive the request from the first client device 108(1) and may access the whitelist data structure 200 to determine whether users 134(2)-134(4) are permitted to access the shared folder of the first user. In this case, since profile1, profile2, and profile3 are listed in the sharing whitelist for profile1, the service computing device 102 sends invitations to the second user 134(2) (associated with profile2), the third user 134(3) (associated with profile3) and the fourth user 1234(4) (associated with profile1).

On the other hand, if the second user 134(2) (associated with profile2) were to send a request to invite users 134(1), 134(3) and 134(4) to access a shared folder of the second user 134(2), the service computing device 102 may determine that only profile2 is listed in the profiles whitelisted for sharing for profile2, and may send a notification to the second client device 108(2) to inform the second user 134(2) that users 134(1), 134(3) and 134(4) are not permitted to access the shared folder the second user 134(2). Thus, the profile sharing whitelists herein are one-directional.

Similarly, if the third user 134(3) (associated with profile3) were to send a request to invite users 134(1), 134(2), and 134(4) to access a shared folder of the third user 134(3), the service computing device 102 may determine that only profile3 and profile2 are listed in the profiles whitelisted for sharing for profile3, may send an invitation to second user 134(2) at the second client device 108(2), and may send a notification to the third client device 108(3) to inform the third user 134(2) that users 134(1) and 134(4) are not permitted to access the shared folder of the third user 134(3).

Figure 3:
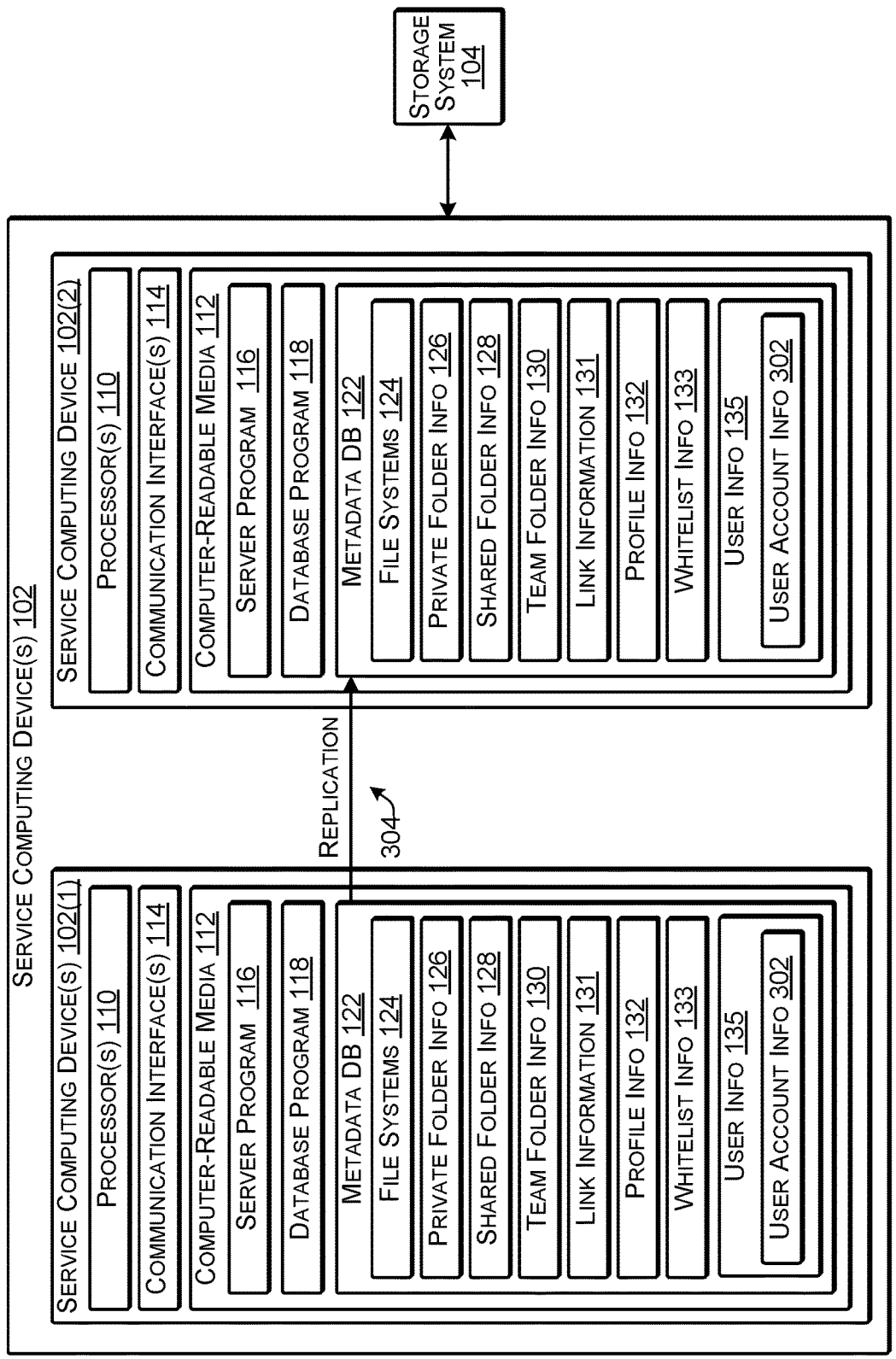
FIG. 3 illustrates an example system architecture of service computing devices according to some implementations.

FIG. 3 illustrates one possible example configuration 300 of the one or more service computing device(s) 102 according to some implementations. In the example configuration 300, a first service computing device 102(1) may be coupled to a second service computing device 102(2). For example, the first service computing device 102(1) and second service computing device 102(2) may together form a computing pod for providing storage and data management services to a plurality of the client devices 108 (not shown in FIG. 3). In some examples, the first service computing device 102(1) may act as a master or primary computing device, while the second service computing device 102(2) may act as a slave or secondary computing device, at least with respect to maintaining the metadata database 122. For instance, the database program 118 on the first service computing device 102(1) may update and maintain the metadata database 122 on the first service computing device 102(1). For example, the database program 118 on the first service computing device 102(1) may manage the file systems 124, private folder information 126, shared folder information 128, team folder information 130, link information 131, profile information 132, whitelist information 133, and user information 135, including user account information 302.

As indicated at 304, the database program 118, or other program, on the first service computing device 102(1) may replicate the metadata database 122 to the second service computing device 102(2). Accordingly, the second service computing device 102(2) may maintain a replica of the metadata database 122, which may include a replica of the file systems 124, private folder information 126, shared folder information 128, team folder information 130, link information 131, profile information 132, whitelist information 133, and user information 135. Should the first service computing device 102(1) suffer a failure, the second service computing device 102(2) may assume the role of primary computing device while the first service computing device 102(1) is replaced with a different service computing device (not shown in FIG. 3) and/or repaired. During this time, the second service computing device 102(2) may maintain and update the metadata database 122, and interact with the client devices 108 and storage system 104. Furthermore, the example of FIG. 3 is just one example of a possible configuration of the one or more service computing devices 102. Numerous other configurations will be apparent to those of skill in the art having the benefit of the disclosure herein.

Figure 4:
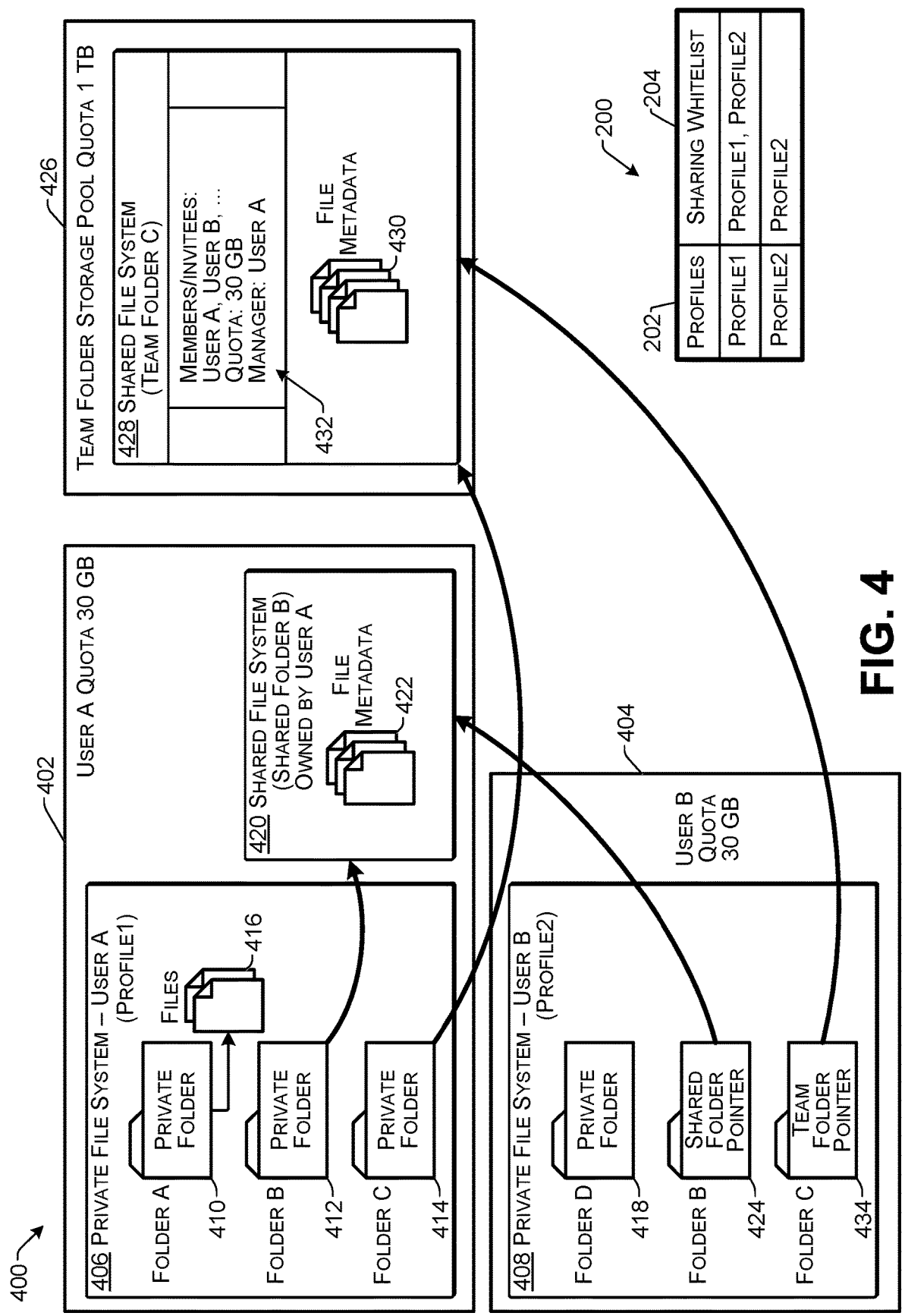
FIG. 4 illustrates examples of different types of folders according to some implementations.

FIG. 4 is a block diagram 400 illustrating an example of managing private folders, shared folders, and team folders based on whitelist profiles according to some implementations. The illustrated information of FIG. 4 may at least partially represent metadata in the metadata database 122 managed by the service computing device 102. In this example, the whitelist information data structure 200 shows that profile1 has sharing whitelisting enabled for profile1 and profile2, while profile2 has sharing whitelisting enabled for only profile2.

In addition, suppose that user A is associated with profile1 and has a storage quota of 30 GB, as indicated at 402, and user B is associated with profile2, and also has a storage quota of 30 GB, as indicated at 404. User A has a private file system for maintaining user A's private folders and files, and user B has a private file system 408 for maintaining user B's private folders and files. For example, suppose that user A initially has a private folder A 410, a private folder B 412, and a private folder C 414. For instance, at least some of user A's private files 416 may be stored in private folder A. Furthermore, suppose that user B initially has private folder D 418.

As mentioned above, a private folder may be a folder that is owned by and can typically only be accessed by a particular user. For instance, data objects, such as files 416, that are maintained in a private folder can only be accessed by the particular user that owns the private folder, and are therefore private to that user. The private folder may exist in the particular user's private file system. The storage consumed by the objects (e.g., files) stored in the storage system in association with the private folder may count toward the user's storage quota.

In some cases, a user may desire to share a folder with one or more other users, and may therefore create a shared folder. In this example, suppose that user A would like to create a shared folder to be shared with one or more users that include user B. Accordingly, user A may convert folder B 412 to a shared folder. In this example, when the user converts folder B to a shared folder, the database program 118 (not shown in FIG. 4) may create a new shared file system 420 to include the shared folder B. For example, the database program may create a new set of tables or other data structures in the metadata database that will serve as a shared file system 420, owned by user A, for use as the shared folder B. Furthermore, the database program may copy file metadata 422 for any files that were stored in the private folder B to the shared file system 420 for the shared folder B. The file metadata 422 corresponds to actual file content of files or other objects stored in the storage system 104 (not shown in FIG. 4) and associated with the shared folder B. The private folder B 412 in the private file system 406 of user A is deleted and replaced with a shared folder pointer (not shown in FIG. 4) which may have the same name as private folder B, and which points to the shared file system 420 which serves as shared folder B.

The new shared file system 420 is owned by user A and therefore the files stored in association with folder B count against user A's storage quota of 30 GB. User A may invite user B to share the shared folder B. For example, user A may send an invitation request to the service computing device (not shown in FIG. 4) to request that user B be invited to access the shared folder B. The database program checks the whitelist profiles for user A and user B, and determines that user A is associated with profile1 and user B is associated with profile2. Further, the database program determines that the profiles whitelisted for sharing for profile1 include profile1 and profile2. Accordingly, the database program determines that user B is permitted to access the shared folder B owned by user A and sends an invitation to user B to access the shared folder B. On the other hand, if user B created a shared folder, and requested user A be invited to access the shared folder, the request would be denied because profile1 is not included in the profiles whitelisted for sharing for profile2.

Upon receiving a response from user B to accept the invitation, the database program may create a pointer 424 in user B's private file system 408 for the shared folder B. Accordingly, a shared folder may be a folder that exists in its own file system and is owned by one user but is accessed by one or more users. For example, user B may access the files corresponding to the file metadata 422 in the shared folder B, and may store additional files to the storage associated with the shared folder B. However, the storage consumed by the objects (e.g., files) stored in the shared folder B counts toward the owner's storage quota, i.e., user A's quota. Consequently, a particular user's storage quota may be quickly consumed by shared folders that are used for large projects or that are shared by a large number of users.

To address this issue, implementations herein provide team folders, which use storage allocated from a separate team folder storage pool 426. Thus, a team folder may be a folder that is not owned by any user but which may be accessed and managed by one or more users. The team folder may exist in its own file system. The storage capacity consumed by the objects stored in the team folder counts toward a storage quota defined for the team folder, rather than counting toward the storage capacity of any particular user.

In this example, suppose that user A desires to create a team folder and decides to convert private folder C 414 into a team folder. In other examples, the user may convert a shared folder into a team folder. Assuming the conversion request is approved, e.g., automatically by the database program or by the administrator, such as based on a requested size or other considerations, the database program may create a new shared file system 428 as the team folder C, which uses storage allocated from the team folder storage pool 426. Following copying of file metadata 430 from the private folder C 414 to the team folder C, the private folder C 414 in the private file system 406 of user A is deleted and replaced with a team folder pointer (not shown in FIG. 4) which may have the same name as private folder C, and which points to the shared file system 428 for the team folder C.

In this example, user A is the manager of the team folder C. As manager, user A may invite user B to access the team folder C. For example, user A may send an invitation request to the service computing device to request that user B be invited to access the team folder C. The database program checks the whitelist profiles for user A and user B, and determines that user A is associated with profile1 and user B is associated with profile2. Further, the database program determines that the profiles whitelisted for sharing for profile1 include profile1 and profile2. Accordingly, the database program determines that user B is permitted to access the team folder C of which user A is the manager, and sends an invitation to user B to access the team folder C. On the other hand, if user B was manager of a team folder, and requested user A be invited to access the team folder, the request would be denied because profile1 is not included in the profiles whitelisted for sharing for profile2.

Following user B's acceptance of the invitation to join the team folder C, as indicated at 432, the members of the team folder C include user A and user B, the assigned storage quota is 30 GB, and the manager for the team folder C is user A. Furthermore, the metadata 430 may represent any files (or other objects) stored in the storage system for private folder C that are now stored in association with team folder C, and which now count against the storage quota of team folder C, rather than the storage quota of user A. In addition, the database program may place a pointer 434 in user B's private file system, such as a mount record, for enabling user B to access the team folder C, such as by selecting the pointer 434 in a user interface presented by the client application on the client device associated with user B. Accordingly, after the user accepts the invitation, the team folder C will appear by name in user B's list of folders in user B's filesystem. User B may click on the folder name or icon to access the team folder C.

Figure 5:
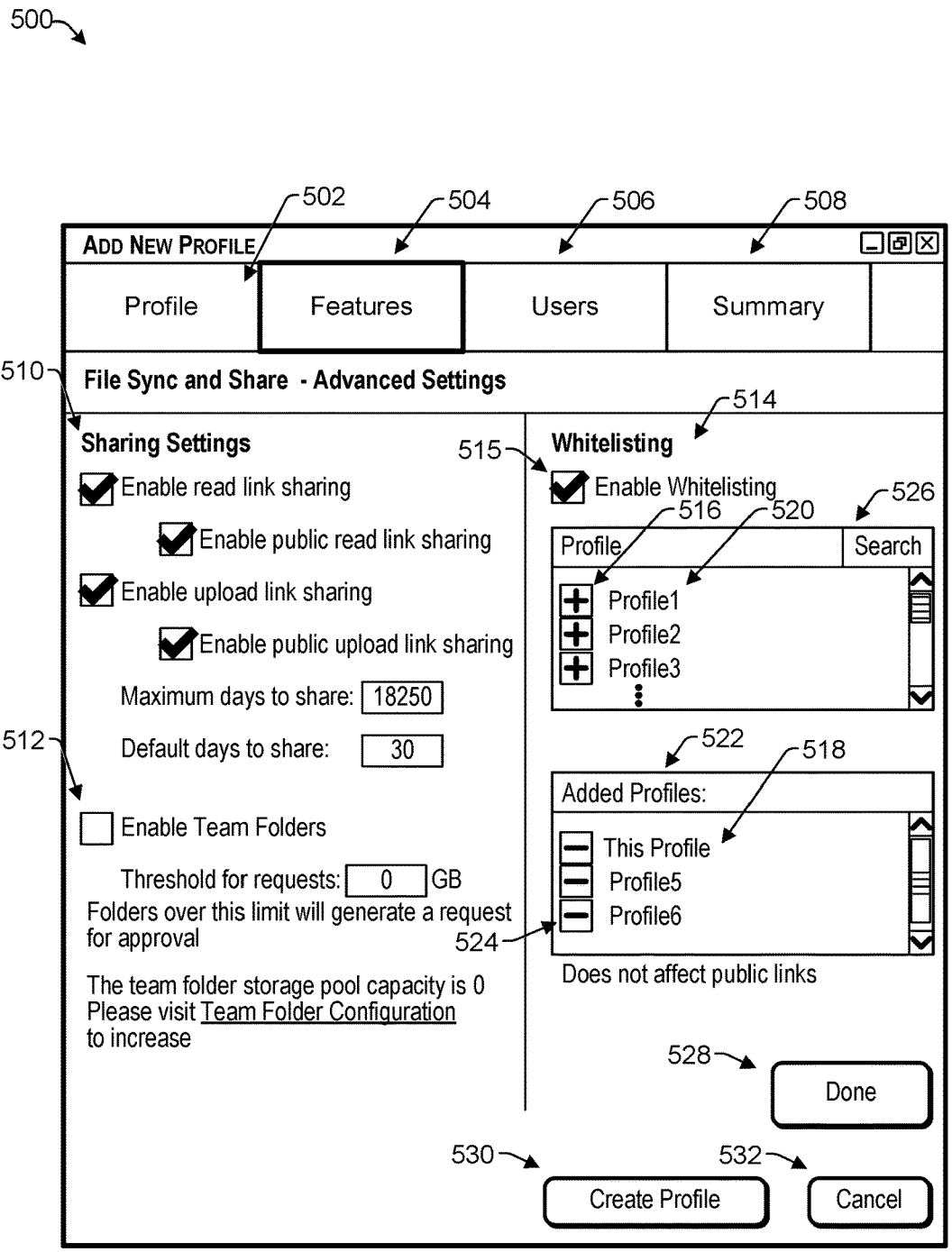
FIG. 5 illustrates an example user interface for managing sharing whitelisting using profiles according to some implementations.

FIG. 5 illustrates an example user interface 500 able to be used for managing whitelist profile settings according to some implementations. For instance, the user interface 500 may be presented on a display of the administrator computing device or a computing device of other user having sufficient permission status for adding profiles and setting whitelist profile information. Options for the user interface 500 include a "profile" control 502 for selecting a profile, a "features" control 504 for specifying features of a selected profile, a "users" control 506 for associating the profile with specific users or groups of users, and a "summary" control 508 for viewing a summary of information for the profile. In this example, the user has selected the features control 504 for specifying features of a new profile for controlling file synchronizing and sharing.

As mentioned above, a profile may include a mapping of functionality granted by the system to the individual users. In some examples, groups of users may have the same or similar profiles with the same or similar settings within the system. For example, the profiles may indicate with which other users each user is permitted to share folders, links, and/or other information. Further, the profiles herein may also indicate whether particular users are able to create team folders, and if so, how large those team folders may be when created. For instance, the administrator may create profiles based on ACTIVE DIRECTORY® groups, security identity provider of a user, or the like, and may use the profiles to map permissions to those users.

As indicated at 510, the user interface 500 enables the administrator to set profile-based sharing settings, such enabling read link sharing, enabling upload link sharing, enabling public link upload sharing, and so forth. Additionally, as indicated at 512, the administrator may enable users to create team folders, and may enable the administrator to set the maximum threshold size for team folders for the profile. If a user with whom the profile is associated desires to create a team folder that is larger than the threshold, the request may be required to be approved by an administrator before the team folder is created by the system. Furthermore, in some examples and additional user interface may be provided that enables the administrator to set the maximum size of the team folder storage pool and/or set different profile parameters for various different users for various different team folder settings.

In addition, the user interface 500 may include a whitelisting UI 514 with a control 515 for enabling profile-based whitelisting and, when enabled, for selecting profiles for sharing whitelisting for the current profile. For example, as indicated at 516, the administrator may click on or otherwise select a plus ("+") symbol (or may use any other suitable technique) to add a profile to a sharing whitelist 518 of profiles with which members of the current profile will be permitted to share information. Clicking the plus symbol 516 next to a profile from the top list 520 adds the selected profile to the sharing whitelist 518 in the bottom table 522 of added profiles. Similarly, a selected profile may be removed from the sharing whitelist 518 of added profiles by clicking a minus ("−") symbol next to the selected profile (or through any other suitable technique), thus removing the selected profile from the sharing whitelist 518. The administrator may employ a search tool 526 when there are a large number of possible profiles to choose from. The administrator may select a "done" control 528 to save the changes, and may select a "create profile" control 530 when selection of all settings for the new profile is complete. Alternatively, if the administrator decides to not create the profile, the administrator may select a "cancel" control 532. After the profile changes for users are saved, all users associated with that profile will have their sharing whitelists updated accordingly.

Figure 6:
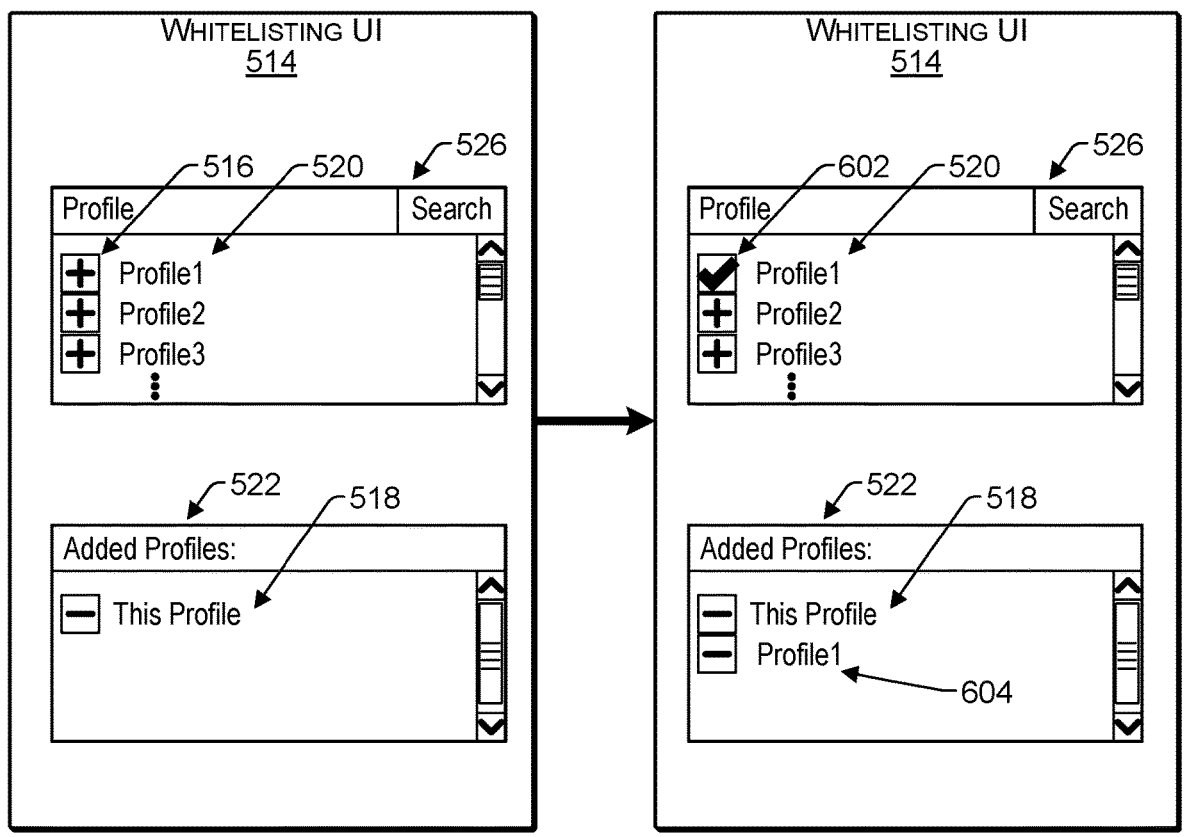
FIG. 6 illustrates an example user interface for managing sharing whitelisting using profiles according to some implementations.

FIG. 6 illustrates the example user interface 514 for managing profile whitelists according to some implementations. In this example, list 520 includes profile1, profile2, profile3, . . . , while the sharing whitelist 518 includes only the current profile. In this example, suppose that the administrator decides to select profile1 to be added to the sharing whitelist 518 for the current profile. Accordingly, the administrator may click on or otherwise select the plus symbol next to profile1. In response, an indicator 602 may indicate that profile1 has been added to the sharing whitelist 518. In addition, the selected profile may be shown as now included in the sharing whitelist 518, as indicated as 604.

Figure 7:
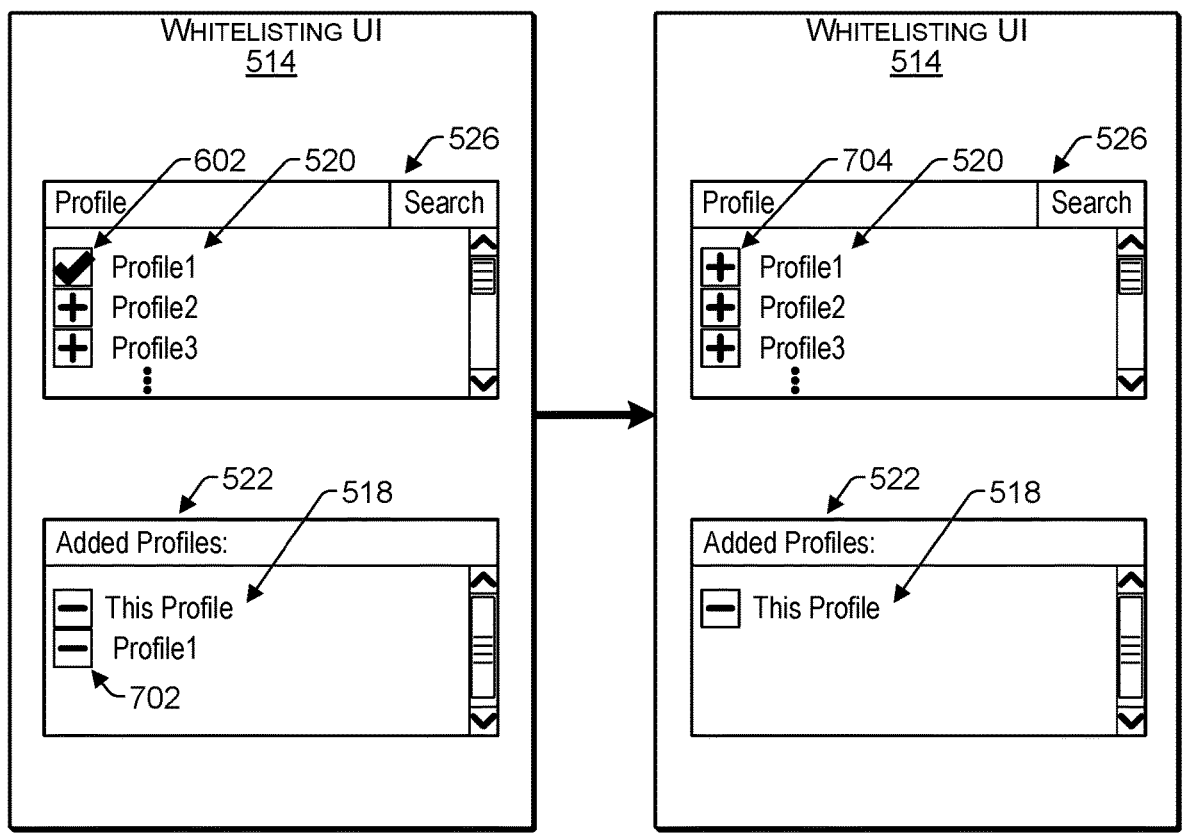
FIG. 7 illustrates an example user interface for managing sharing whitelisting using profiles according to some implementations.

FIG. 7 illustrates the example user interface 514 for managing profile whitelists according to some implementations. In this example, suppose that the administrator decides to remove profile1 from the sharing whitelist of the currently selected profile. Accordingly, the administrator may click on, or otherwise select, the minus symbol 702 adjacent to profile1 in the sharing whitelist 518. In response, as indicated at 704, a plus symbol replaces the selected indicator 602 adjacent to profile1 in the list 520. Further, profile1 is removed from the sharing whitelist 518.

FIGS. 8-12 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 8:
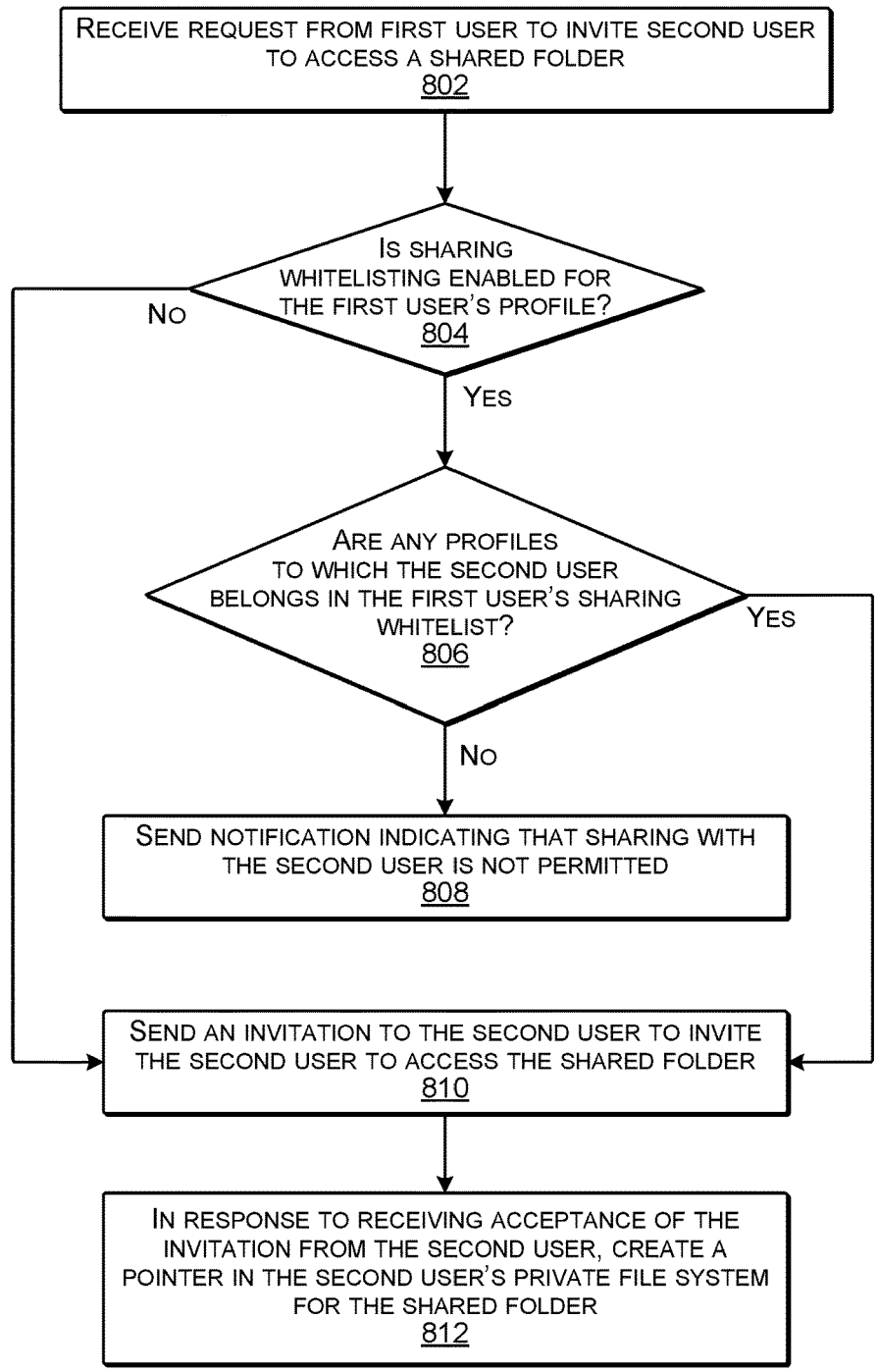
FIG. 8 is a flow diagram illustrating an example process for managing sharing of a shared folder according to some implementations.

FIG. 8 is a flow diagram illustrating an example process 800 according to some implementations. In some cases, the process 800 may be executed at least in part by the service computing device or other suitable computing device. As one example, the server program 116 executed by the one of more processors of the service computing device(s) 102 discussed above with respect to FIGS. 1 and 3 may include executable instructions for performing at least part of the process 800 of FIG. 8.

At 802, the computing device may receive a request from a client device associated with the first user to invite a second user to access a shared folder of the first user. For example, the first user may have created the shared folder in a file system associated with the first user, and the first user may be the owner of the shared folder.

At 804, the computing device may determine whether sharing whitelisting is enabled for the first user's profile. If sharing whitelisting is enabled for the profile with which the first user is associated, then the process goes to block 806; otherwise, the process goes to block 810, as whitelisting is not enforced if whitelisting is not enabled for the user's profile. Furthermore, if the first user is a member of two profiles, in which one profile has whitelisting enabled and the other profile does not, then the most permissive profile may apply. Accordingly, if the first user is a member of a first profile that has sharing whitelisting enabled, and a second profile that does not have sharing whitelisting enabled, then the process may proceed to block 810, as whitelisting is not enforced in this situation.

At 806, the computing device may determine whether there are any profiles to which the second user belongs in the first user's sharing whitelist. Furthermore, if the first user is a member of two or more profiles that have whitelisting enabled, then if any one of those profiles includes the profile of the second user in its whitelist, sharing with the second user is allowed. Accordingly, if the first user is a member of a first profile that has the profile of the second user in its whitelist, and is a member of a second profile that does not have the profile of the second user in its whitelist, then the process may still proceed to block 810 as sharing with the second user is permitted in this situation.

At 808, if the profile of the second user is not included in the whitelist of any profile of the first user, the computing device may send a notification the device of the first user indicating that sharing with the second user is not permitted.

At 810, if sharing whitelisting is not enabled for at least one profile of the first user, or if sharing whitelisting is enabled for all profiles of the first user and the profile of the second user is included in a whitelist of at least one of these profiles, the computing device may send an invitation to the second user to invite the second user to access the shared folder.

At 812, the computing device may, in response to receiving acceptance of the invitation from the second user, create a pointer in the second user's private file system that points to the shared folder in the first user's private file system.

Figure 9:
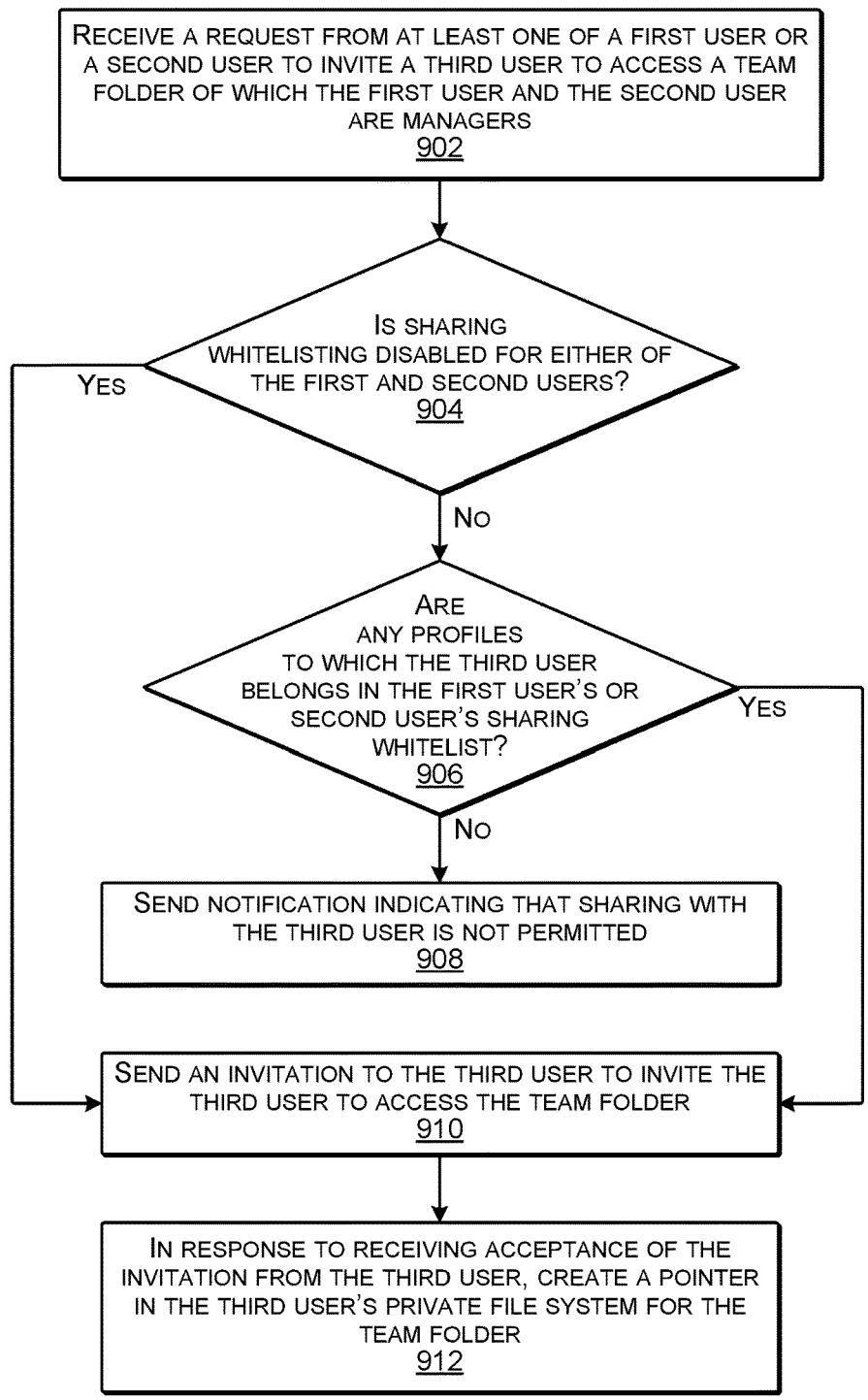
FIG. 9 is a flow diagram illustrating an example process for managing sharing of a team folder according to some implementations.

FIG. 9 is a flow diagram illustrating an example process 900 according to some implementations. In some cases, the process 900 may be executed at least in part by the service computing device or other suitable computing device. As one example, the server program 116 executed by the one of more processors of the service computing device(s) 102 discussed above with respect to FIGS. 1 and 3 may include executable instructions for performing at least part of the process 900 of FIG. 9.

At 902, the computing device may receive a request from at least one of a first client device associated with a first user or a second client device associated with a second user to invite a third user to access a team folder of which the first user and the second user are managers. For instance, both the first user and the second user may be managers of the team folder.

At 904, the computing device may determine whether sharing whitelisting is disabled for any profile associated with either of the first user or the second user. If so, then whitelisting is not enforced and the process goes to block 910. Otherwise, the process goes to block 906. For example, if sharing whitelisting is enabled for a first profile of the first user, but is not enabled for a second profile of the second user, the sharing whitelisting is not enforced in this situation, and the process proceeds to block 910. On the other hand, if sharing whitelisting is enabled for all of the profiles to which the first user and the second user belong, then the process proceeds to block 906.

At 906, the computing device may determine whether any profiles to which the third user belongs are included in the sharing whitelist of any profile of at least one of the first user or the second user. If not, the process goes to block 908 to deny the request; otherwise, the process goes to block 910.

At 908, if the profile of the third user is not included in the whitelist of any profile of the first user or the second user, the computing device may send a notification indicating that sharing of the team folder with the third user is not permitted. For example, the notification may be sent to the client device of the user from which the request was received.

At 910, if sharing whitelisting is disabled (i.e., not enabled) for at least one profile of the first user or the second user, or if sharing whitelisting is enabled for all profiles of the first user and the second user and the profile of the third user is included in a whitelist of at least one of these profiles, the computing device may send an invitation to the third user to invite the third user to access the team folder. For example, the computing device may send the invitation to a client device associated with a user account associated with the third user, such as based on log in credentials, or the like.

At 912, in response to receiving acceptance of the invitation from the third user, the computing device may create a pointer in the third user's private file system that points to the team folder, which may be maintained in a shared file system. Furthermore, as another example, suppose that after access to the team folder has been shared with the third user, that the third user is transferred to a different department or otherwise becomes associated with a profile that is not included in the sharing whitelist of any profile of the first user or the second user. Should the first or second user subsequently send an invitation to the third user to access a new, second team folder, the service computing device may deny the request to invite the third user to access the new team folder, but the third user does not lose the ability to access the original team folder because the pointer in the third user's private file system is not deleted due to the change in the profile of the third user. Accordingly, if the third user is to be denied access to the original team folder following the change in the profile of the third user, the pointer (e.g., the mount record) in the private file system of the third user can be deleted, such as by the administrator or based on a request from one of the managers of the original team folder. Alternatively, in some cases, the manager of the team folder may manually delete the user from being a member of the team folder. The situation with a shared folder may be handled similarly. For instance, the owner of the shared folder may manually delete the user from being a member of the shared folder. In some cases, the administrator may remove the user at the folder owner's request. On the other hand, as discussed below, the situation in which the user's profile is changed may be treated differently with respect to a shared private link, as the permission to access a shared private link is checked each time a user tries to access the link.

Figure 10:
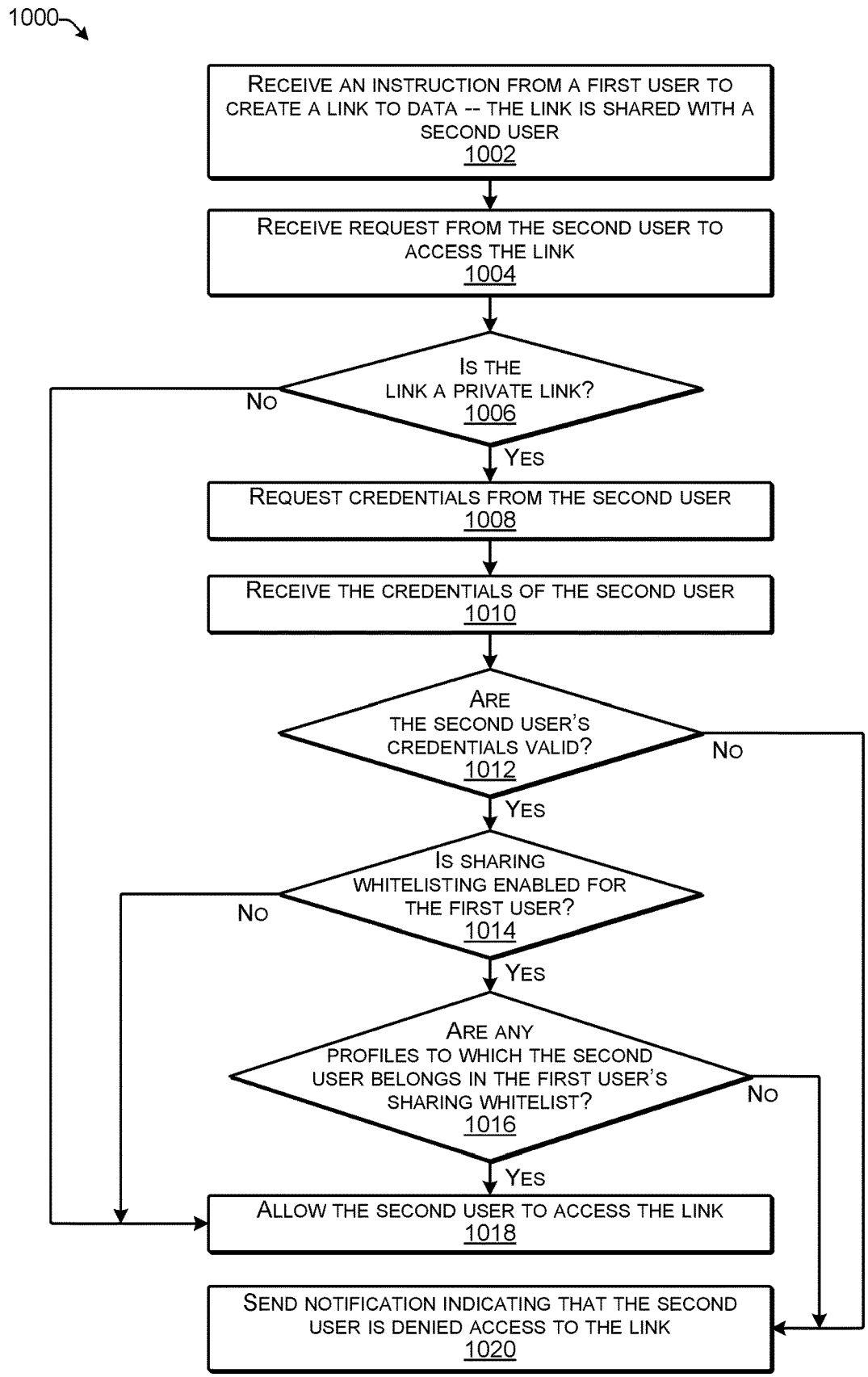
FIG. 10 is a flow diagram illustrating an example process for managing sharing of a link according to some implementations.

FIG. 10 is a flow diagram illustrating an example process 1000 according to some implementations. In some cases, the process 1000 may be executed at least in part by the service computing device or other suitable computing device. As one example, the server program 116 executed by the one of more processors of the service computing device(s) 102 discussed above with respect to FIGS. 1 and 3 may include executable instructions for performing at least part of the process 1000 of FIG. 10.

At 1002, the computing device may receive an instruction from a first user to create a link. The link may point to information of the user, such as a file, folder, or other information provided by the user for creation of the link. In some examples, the link may be a private link or a public link. The first user may subsequently share the link with a second user, such as through an email, through an HTML link in a document, through a chat session, or through any other technique.

At 1004, the computing device may create the link and may subsequently receive a request from a client device of the second user to request to access the link.

At 1006, the computing device may determine whether the link is a private link or a public link. If the link is a public link, then sharing whitelisting is not enforced and the process goes to block 1018. On the other hand, if the link is a private link, then the process goes to block 1008. Further, the computing device may determine the user that created the link, i.e., the first user in this example.

At 1008, if the link is a private link, the computing device may check that the credentials of the second user have been received. For example, if the user is not already logged in with the service computing device when the second user attempts to access the link, the service computing device may ask the second user to log in, or otherwise provide user credentials, such as user name, password, or other credentials authorizing the second user to access information from the service computing device.

At 1010, the computing device may receive the credentials of the second user. For example, the second user may use one or more input components of the second client device, or other suitable technique, to provide the credentials of the second user to the service computing device.

At 1012, the computing device may determine whether the credentials provided by the second user are valid. For example, the computing device may compare the credentials with those stored in a database, or the like, to determine the validity of the credentials provided by the second user. If the credentials are valid, the process proceeds to block 1014; if not, the process goes to block 1020.

At 1014, the computing device may determine whether sharing whitelisting is enabled for each profile of the first user. If so, the process proceeds to block 1016; if not, the process proceeds to block 1018. For example, if any profile associated with the first user does not have sharing whitelisting enabled, then sharing of the private link is permitted.

At 1016, if sharing whitelisting is enabled for all profiles to which the first user belongs, the computing device may determine whether any profiles to which the second user belongs are in a sharing whitelist of any profile to which the first user belongs. For example, as long as at least one profile of the second user is in a sharing whitelist of a least one profile of the first user, then the second user is permitted to access the shared link. If so, the process goes to block 1018; if not, the process goes to block 1020.

At 1018, the computing device enables the second user to access the link. For example, the computing device may send the information associated with the link to an application on the client device of the second user. For instance, the application on the client device may be a browser or any other client application able to access and receive the link information from the service computing device. Furthermore, suppose that at a later time, the profile of the second user is removed from the sharing whitelist of the profile of the first user. If the second user tries to access the link after this happens, then the second user may be denied access to the link based on the profile of the second user no longer being included in the sharing whitelist of the profile of the first user. Thus, at that time, block 1020 would apply to the second user's request to access the link.

At 1020, the computing device sends a notification to the client device of the second user indicating that the second user is denied access to the link. As discussed above, the second user may be denied access to the link if the second user's credentials are not valid or if the second user belongs to a profile that is not in the first user sharing whitelist of any profile of the first user. Furthermore, suppose that the second user is initially allowed to access the link at block 1018, such as based on the second user's profile being included in a sharing whitelist of the first user's profile. Subsequently, suppose that the second user is moved to a different profile, such as due to being transferred to a different department in the organization, due to other change in status, or the like. Further, suppose that the new profile of the second user is not in any sharing whitelist of any profile associated with the first user. Accordingly, should the second user try to access the link again, the service computing device may deny access to the second user and perform the process of block 1020.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
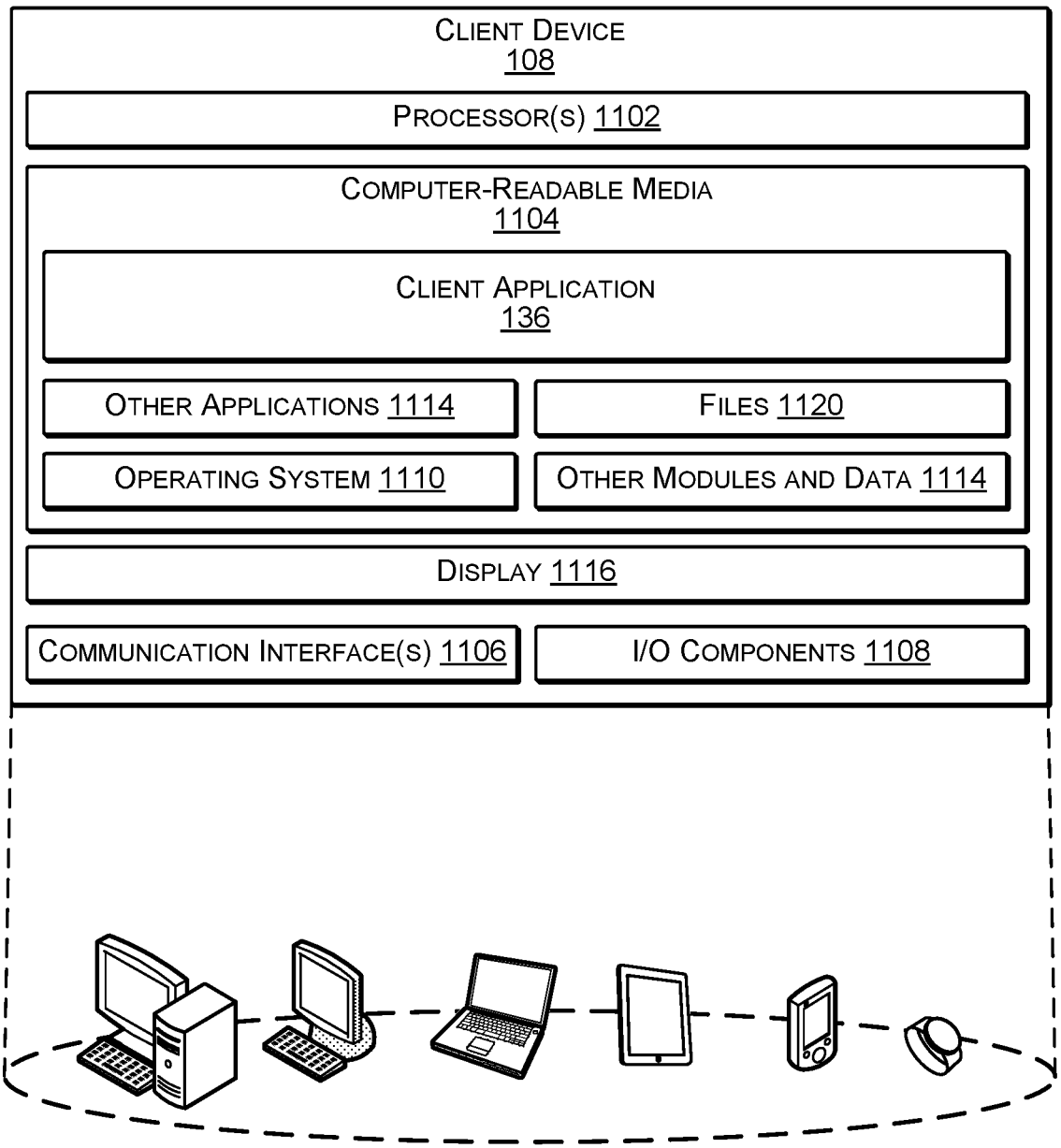
FIG. 11 illustrates an example configuration of a client device according to some implementations.

FIG. 11 illustrates select example components of an example client device 108 according to some implementations. Each client device 108 may be any suitable type of computing device such as a workstation, desktop, laptop, tablet computing device, mobile device, smart phone, wearable computing device, or any other type of computing device able to send and receive data over a network. Furthermore, the client devices 108 may be able to communicate with the one or more service computing devices 102 through the one or more networks 106, through separate networks, or through any other suitable type of communication connection (not shown in FIG. 11). Numerous other variations may be apparent to those of skill in the art having the benefit of the disclosure herein.

In a basic configuration, the client device 108 includes components such as at least one processor 1102, one or more computer-readable media 1104, one or more communication interfaces 1106, and one or more input/output (I/O) components 1108. Each processor 1102 may itself comprise one or more processors or processing cores. For example, each processor 1102 may be implemented as one or more microprocessors, microcomputers, microcontrollers, digital signal processors, central processing units, state machines, logic circuitries, and/or any devices that manipulate signals based on operational instructions. In some cases, the processor 1102 may include one or more hardware processors and/or logic circuits of any suitable type specifically programmed or configured to execute the processes and other algorithms described herein. The processor 1102 may be configured to fetch and execute computer-readable processor-executable instructions stored in the computer-readable media 1104.

Depending on the configuration of the client device 108, the computer-readable media 1104 may be an example of tangible non-transitory computer-readable media and may include volatile and nonvolatile memory and/or removable and non-removable media implemented in any type of technology for storage of information such as computer-readable processor-executable instructions, data structures, program modules, or other data. The computer-readable media 1104 may include, but is not limited to, RAM, ROM, EEPROM, flash memory, solid-state storage, optical storage, magnetic disk storage, magnetic tape, and/or other types of storage technology. Further, in some cases, the client device 108 may access external storage, such as directly, through another computing device, or through a network. Accordingly, the computer-readable media 1104 may be computer storage media able to store instructions, programs, or software code that may be executed by the processor 1102.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the client devices 108. Functional components of the client device 108 stored in the computer-readable media 1104 may include the client application 136, as discussed above. Additional functional components may include an operating system 1110 for controlling and managing various functions of the client device 108 and for enabling basic user interactions with the client device 108. The computer-readable media 1104 may further include one or more other applications 1114 that may be executed on the client devices 108 for performing various functions and tasks, which may include a browser application. Additionally, or alternatively, in some cases, the client application 136 may be or may include a browser.

In addition, the computer-readable media 1104 may also store data, data structures and the like, that are used by the functional components. For example, data and data structures stored by the computer-readable media 1104 may include one or more files 1112 and/or other data objects. Depending on the type of the client device 108, the computer-readable media 1104 may also optionally include other functional components and data, such as other modules and data 1114, which may include programs, drivers, etc., and the data used or generated by the functional components. Further, the client device 108 may include many other logical, programmatic, and physical components, of which those described are merely examples that are related to the discussion herein.

The client device 108 may further include the one or more communication interfaces 1106. The communication interface(s) 1106 may include one or more interfaces and hardware components for enabling communication with various other devices, such as over the network(s) 105 and 106. For example, the communication interfaces 1106 may include, or may couple to, one or more ports that provide connection to the network(s) 106 for communication with the service computing devices 102 or other computing devices. For example, the communication interface(s) 1106 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The client device 108 may further include the I/O components 1108, such as speakers, a microphone, a camera, and various user controls (e.g., buttons, a joystick, a keyboard, a keypad, a touch screen, etc.), a haptic output device, and so forth. For example, the operating system 1110 of the client device 108 may include suitable drivers configured to accept input from a keypad, keyboard, or other user controls and devices included with the I/O components 1108. In addition, the client device 108 may include a display 1116, which may be passive, emissive or any other form of display. Additionally, the client device 108 may include various other components that are not shown, examples of which include various types of sensors, a Global Positioning System device, a power source, such as a battery and power control unit, and so forth. Furthermore, in some examples, the administrator computing device 162 may have a hardware configuration similar the client devices 108, but with different functional components, as discussed above.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations comprising:
receiving a conversion request to convert a first folder to a team folder, wherein the first folder is one of a private folder or a shared folder maintained in a private file system of a first user account associated with a first user;
in response to the conversion request:
creating a shared file system as the team folder using storage capacity allocated from a team folder storage pool that is separate from a storage allocation allocated to the first user account;
copying at least metadata from the first folder to the team folder; and
placing a pointer to the shared file system in the private file system of the first user account;
receiving a request to allow a second user associated with a second user account to access at least one of the team folder or a link to data associated with the team folder;
determining a first profile associated with the first user account;
determining whether sharing whitelisting is enabled for the first profile;
determining a second profile associated with the second user account;
determining whether the second profile is included in a sharing whitelist of the first profile; and
when sharing whitelisting is enabled for the first profile, allowing a client device associated with the second user account to access the at least one of the team folder or the link when the second profile is included in the sharing whitelist of the first profile.

2. The system as recited in claim 1, wherein:
the first user associated with the first user account is a manager of the team folder, and
the team folder is maintained in the shared file system for access by multiple users.

3. The system as recited in claim 2, wherein receiving the request to allow the second user associated with the second user account to access at least one of the team folder or the link comprises receiving, from a client device associated with the first user account or an account of another manager of the team folder, a request to enable the second user to access the team folder.

4. The system as recited in claim 2, the operations further comprising:
determining that a third user associated with a third user account is also a manager of the team folder;
determining a third profile associated with the third user account; and
prior to allowing the client device associated with the second user account to access the team folder:
determining whether sharing whitelisting is enabled for the third profile; and
when sharing whitelisting is enabled for the third profile and the first profile, allowing the client device associated with the second user account to access the team folder when the second profile is included in at least one of the sharing whitelist of the first profile or a sharing whitelist of the third profile.

5. The system as recited in claim 4, wherein, when sharing whitelisting is disabled for at least one of the third profile or the first profile, allowing the client device associated with the second user account to access the team folder.

6. The system as recited in claim 2, wherein the operation of allowing the client device associated with the second user account to access the team folder comprises creating a pointer to the team folder in a private file system associated with the second user account.

7. The system as recited in claim 1, wherein:
the first folder is a shared folder and a first user associated with the first user account is an owner of the shared folder,
the shared folder is maintained in the private file system associated with the first user account, and
the shared folder is deleted from the private file system based on placing the pointer to the shared file system in the private file system.

8. The system as recited in claim 7, the operations further comprising:
determining a third profile associated with the first user account; and
prior to allowing the client device associated with the second user account to access the team folder:
determining whether sharing whitelisting is enabled for the third profile; and
when sharing whitelisting is enabled for the third profile and the first profile, allowing the client device associated with the second user account to access the team folder when the second profile is included in at least one of the sharing whitelist of the first profile or a sharing whitelist of the third profile.

9. The system as recited in claim 8, wherein, when sharing whitelisting is disabled for at least one of the third profile or the first profile, allowing the client device associated with the second user account to access the team folder.

10. The system as recited in claim 7, wherein the operation of allowing the client device associated with the second user account to access the team folder comprises creating a pointer to the team folder in a private file system associated with the second user account.

11. The system as recited in claim 1, wherein:
receiving the request to allow the second user associated with the second user account to access at least one of-a the team folder or the link comprises receiving, from the client device associated with the second user account, a request to access a private link associated with the first user account,
the operation of allowing the client device associated with the second user account to access the at least one of the team folder or the link, comprises allowing the client device associated with the second user account to access the private link, and
the private link includes a network address for accessing data associated with the first user account.

12. The system as recited in claim 1, the operations further comprising determining that a user credential associated with the second user is valid prior to allowing the client device associated with the second user account to access the private link.

13. The system as recited in claim 1, the operations further comprising receiving, from an administrator computing device, profile information indicating that sharing whitelisting is enabled for the first profile, and further indicating that the second profile is included in the sharing whitelist of the first profile.

14. A method comprising:
receiving, by one or more processors, a conversion request to convert a first folder to a team folder, wherein the first folder is one of a private folder or a shared folder maintained in a private file system of a first user account associated with a first user;
in response to the conversion request:
creating a shared file system as the team folder using storage capacity allocated from a team folder storage pool that is separate from a storage allocation allocated to the first user account;
copying at least metadata from the first folder to the team folder; and
placing a pointer to the shared file system in the private file system of the first user account;
receiving a request to allow a second user associated with a second user account to access at least one of-a the team folder or a link to data associated with the team folder;
determining a first profile associated with the first user account;
determining whether sharing whitelisting is enabled for the first profile;
determining a second profile associated with the second user account;
determining whether the second profile is included in a sharing whitelist of the first profile; and
when sharing whitelisting is enabled for the first profile, allowing a client device associated with the second user account to access the at least one of the team folder or the link when the second profile is included in the sharing whitelist of the first profile.

15. The method as recited in claim 14, wherein:
the first folder is a shared folder and a first user associated with the first user account is an owner of the shared folder,
the shared folder is maintained in the private file system associated with the first user account, and
the shared folder is deleted from the private file system based on placing the pointer to the shared file system in the private file system.

16. The method as recited in claim 14, wherein:
receiving the request to allow the second user associated with the second user account to access at least one of the team folder or the link comprises receiving, from the client device associated with the second user account, a request to access a private link associated with the first user account,
the operation of allowing the client device associated with the second user account to access the at least one of the team folder or the link, comprises allowing the client device associated with the second user account to access the private link, and
the private link includes a network address for accessing data associated with the first user account.

17. The method as recited in claim 14, further comprising receiving, from an administrator computing device, profile information indicating that sharing whitelisting is enabled for the first profile, and further indicating that the second profile is included in the sharing whitelist of the first profile.

18. One or more non-transitory computer-readable media storing instructions that, when executed by one or more processors, program the one or more processors to:
receive a conversion request to convert a first folder to a team folder, wherein the first folder is one of a private folder or a shared folder maintained in a private file system of a first user account associated with a first user;
in response to the conversion request:
create a shared file system as the team folder using storage capacity allocated from a team folder storage pool that is separate from a storage allocation allocated to the first user account;
copy at least metadata from the first folder to the team folder; and
place a pointer to the shared file system in the private file system of the first user account;
receive a request to allow a second user associated with a second user account to access at least one of the team folder or a link to data associated with the team folder;
determine a first profile associated with the first user account;
determine whether sharing whitelisting is enabled for the first profile;
determine a second profile associated with the second user account;
determine whether the second profile is included in a sharing whitelist of the first profile; and
when sharing whitelisting is enabled for the first profile, allow a client device associated with the second user account to access the at least one of the team folder or the link when the second profile is included in the sharing whitelist of the first profile.

19. The one or more non-transitory computer-readable media as recited in claim 18, wherein:
the first folder is a shared folder and a first user associated with the first user account is an owner of the shared folder,
the shared folder is maintained in the private file system associated with the first user account, and
the shared folder is deleted from the private file system based on placing the pointer to the shared file system in the private file system.

20. The one or more non-transitory computer-readable media as recited in claim 18, wherein:
- receiving the request to allow the second user associated with the second user account to access at least one of the team folder or the link comprises receiving, from the client device associated with the second user account, a request to access a private link associated with the first user account,
- the operation of allowing the client device associated with the second user account to access the at least one of the team folder or the link, comprises allowing the client device associated with the second user account to access the private link, and
- the private link includes a network address for accessing data associated with the first user account.

* * * * *